(12) United States Patent
Amagai et al.

(10) Patent No.: US 7,288,341 B2
(45) Date of Patent: Oct. 30, 2007

(54) BATTERY FRAME AND BATTERY (75) Inventors: Ryuichi Amagai, Isehara (JP); Teruo Segawa, Ayase (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 234 days.

(21) Appl. No.: 11/083,249

(22) Filed: Mar. 18, 2005

(65) Prior Publication Data
US 2005/0221177 A1 Oct. 6, 2005

(30) Foreign Application Priority Data
Mar. 30, 2004 (JP) .............................. 2004-099328

(51) Int. Cl.
H01M 6/46 (2006.01)
H01M 2/24 (2006.01)
H01M 2/10 (2006.01)

(52) U.S. Cl. ...................... 429/186; 429/163; 429/162; 429/160

(58) Field of Classification Search ................ 429/186, 429/163, 162, 160
See application file for complete search history.

(56) References Cited

U.S. PATENT DOCUMENTS 3,941,615 A * 3/1976 McDowall ................... 429/149
6,358,641 B1 * 3/2002 Mease ......................... 429/34

FOREIGN PATENT DOCUMENTS

| EP | 0 930 661 A2 | 7/1999 |
| JP | 08-171925 A | 7/1996 |
| JP | 2001-256939 A | 9/2001 |
| JP | 2003-59486 A | 2/2003 |

* cited by examiner

*Primary Examiner*—Patrick Ryan
*Assistant Examiner*—Angela J. Martin
(74) *Attorney, Agent, or Firm*—Foley & Lardner LLP (57) ABSTRACT

A battery frame of the present invention has; any one of a conductive member and an insulating member which are sandwiched between electrode tabs of flat cells arranged in a stacking direction when a battery is formed, the conductive member electrically connecting the flat cells to each other and the insulating member electrically insulating the flat cells from each other; a holding member which holds any one of the conductive member and the insulating member so that the conductive member or the insulating member can swing in the stacking direction; and an electrode supporting portion in which the holding member is provided and which supports each of the electrode tabs of the flat cells. By this structure, it is possible to prevent deformation of the battery frame during the formation of the battery.

13 Claims, 12 Drawing Sheets

BATTERY FRAME AND BATTERY

BACKGROUND OF THE INVENTION

1. Field of the Invention

The present invention relates to battery frames used when stacking flat cells to form a battery, and a battery in which the frames are used.

2. Description of the Related Art

A plurality of single cells is combined in series or parallel to form a battery or a module battery with high power and capacity. For example, it is known that a plurality of flat single cells, each having an electric-power generating element covered with laminate films, is connected to each other in series or parallel to form a battery with high power and capacity (see Japanese Patent Laid-Open Publication No. 2001-256939). A flat single cell in which an electric-power generating element is covered with laminate films is called a laminate cell.

Where a battery is formed using laminate cells of this kind, a plurality of laminate cells is located on the same plane, a plurality of sets of these laminate cells on the same plane is further stacked, and then these laminate cells are connected to each other in series or parallel. By stacking the laminate cells like this, a battery with higher power and capacity can be formed.

When assembling this stack-type battery, locating and stacking laminate cells one by one results in poor workability. Therefore, laminate cells are located on a plate-like frame and a plurality of frames where the cells are located is stacked, thus improving workability in assembling a stack-type battery.

Further, in order to electrically connect the cells located on neighboring frames in the stacking direction, washers made of a conductive material (conductive washers) may be incorporated in the frames at positions where electrode tabs of the laminate cells lie. To electrically insulate cells, washers made of insulating material (insulating washers) may be incorporated in the frames. When electrically connecting or insulating the laminate cells located on neighboring frames in the stacking direction, the frames, where the laminate cells are mounted, are stacked and the frames or washers are pressed from the top and bottom of the stack. This ensures that the electrode tabs and the washers come into contact with to each other, enabling the neighboring cells to be electrically connected or insulated from each other.

SUMMARY OF THE INVENTION

Where conductive washers and insulating washers are incorporated into frames as described above, the washers are fixed to the frames by an adhesive or the like. If the washers and laminate cells have the same height, no loads are applied to the frames.

However, dimensional variations of laminate cells in the height direction (stacking direction) are generally large. Therefore, it is difficult to allow heights of washers and laminate cells to meet each other. Where a height dimension of a laminate cell is larger than that of a washer, too much force is applied to a frame as the frame is pulled towards the washer, because the washer is firmly fixed to the frame. As a result, the frame is deformed.

When the frame is deformed, a reaction force is generated in the frame, which may cause a failure or difficulty to connect the washer and an electrode tab of a laminate cell. Due to this, a circuit is cut off and resistance increases, thus deteriorating characteristics of the battery.

Further, an above-described frame where washers are incorporated is also deformed when the washers has low parallelism to the frame.

The present invention has been accomplished in the light of the above circumstances. An object of the present invention is to provide a battery frame which does not lower workability when assembling a battery and prevents deformation thereof, and a battery in which the frame is used.

The first aspect of the present invention provides a battery frame comprising: any one of a conductive member and an insulating member which are sandwiched between electrode tabs of flat cells arranged in a stacking direction when a battery is formed, the conductive member electrically connecting the flat cells to each other and the insulating member electrically insulating the flat cells from each other; a holding member which holds any one of the conductive member and the insulating member so that the conductive member or the insulating member can swing in the stacking direction; and an electrode supporting portion in which the holding member is provided and which supports each of the electrode tabs of the flat cells.

The second aspect of the present invention provides a battery comprising: a plurality of flat cells; and a plurality of frames stacked while the flat cells are mounted and positioned thereon, wherein each of the frames includes; any one of a conductive member and an insulating member which are sandwiched between electrode tabs of flat cells arranged in a stacking direction when the battery is formed, the conductive member electrically connecting the flat cells to each other and the insulating member electrically insulating the flat cells from each other; a holding member which holds any one of the conductive member and the insulating member so that the conductive member or the insulating member can swing in the stacking direction; and an electrode supporting portion in which the holding member is provided and which supports each of the electrode tabs of the flat cells.

The third aspect of the present invention provides a battery frame, comprising: any one of a conductive member and an insulating member which are sandwiched between electrode tabs of flat cells arranged in a stacking direction when a battery is formed, the conductive member electrically connecting the flat cells to each other and the insulating member electrically insulating the flat cells from each other; holding means for holding any one of the conductive member and the insulating member so that the conductive member or the insulating member can swing in the stacking direction; and an electrode supporting portion in which the holding means is provided and which supports each of the electrode tabs of the flat cells.

BRIEF DESCRIPTION OF THE DRAWINGS

The invention will now be described with reference to the accompanying drawings wherein.

DETAILED DESCRIPTION OF THE PREFERRED EMBODIMENTS

The present invention is described below with reference to drawings.

First Embodiment

As for the first embodiment, the entire battery to which the present invention is applied is first described, and then each constituent will be detailed.

Figure 1:
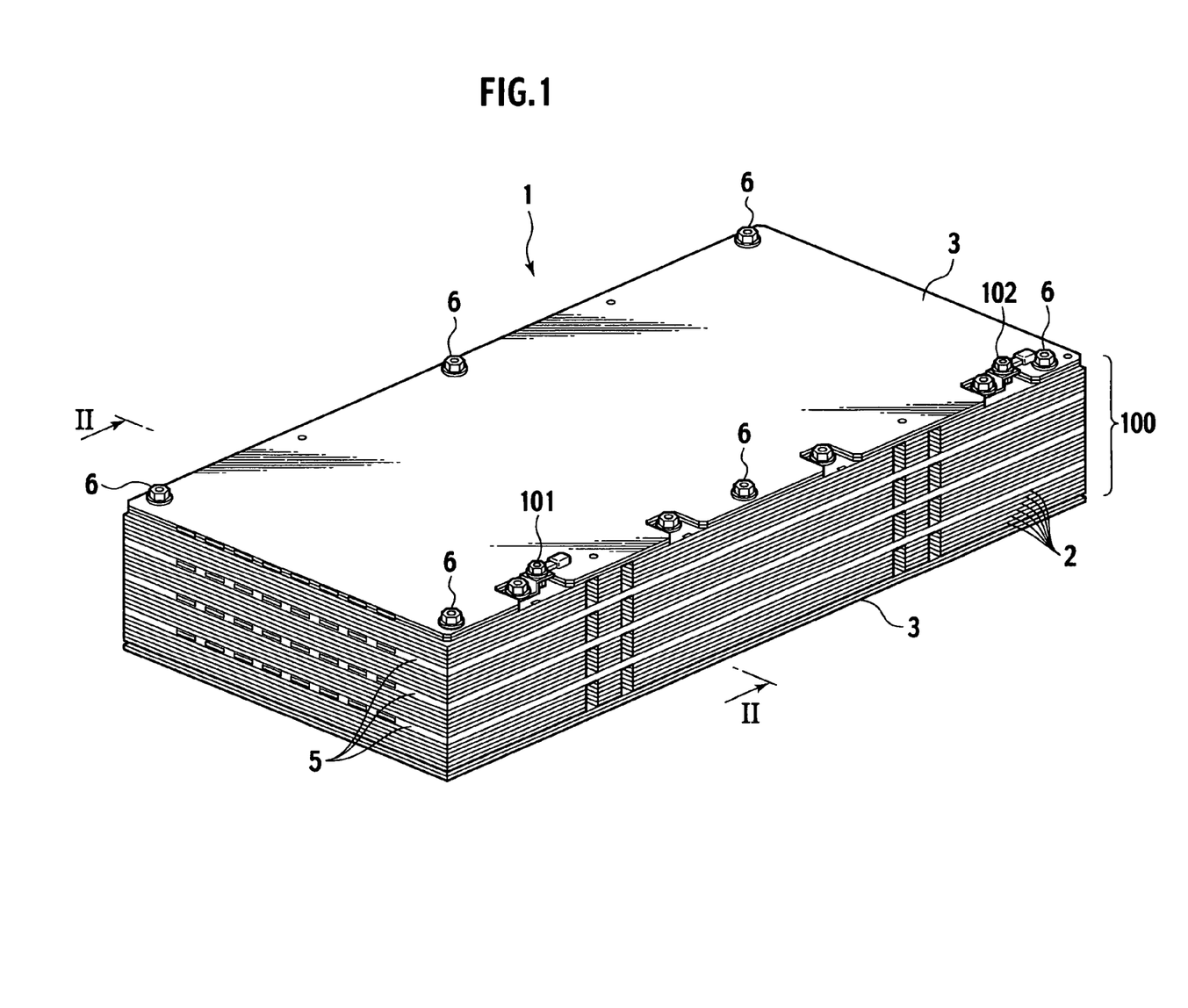
FIG. 1 is a perspective view showing a battery of the present invention.

As shown in FIG. 1, a cell unit 100, made of a plurality of plate-shaped battery frames 2 stacked in the thickness direction, is sandwiched and pressed with heat sinks 3 from both sides in the stacking direction, and the cell unit 100 and the heat sinks 3 are held together, thus forming a battery 1.

Figure 4:
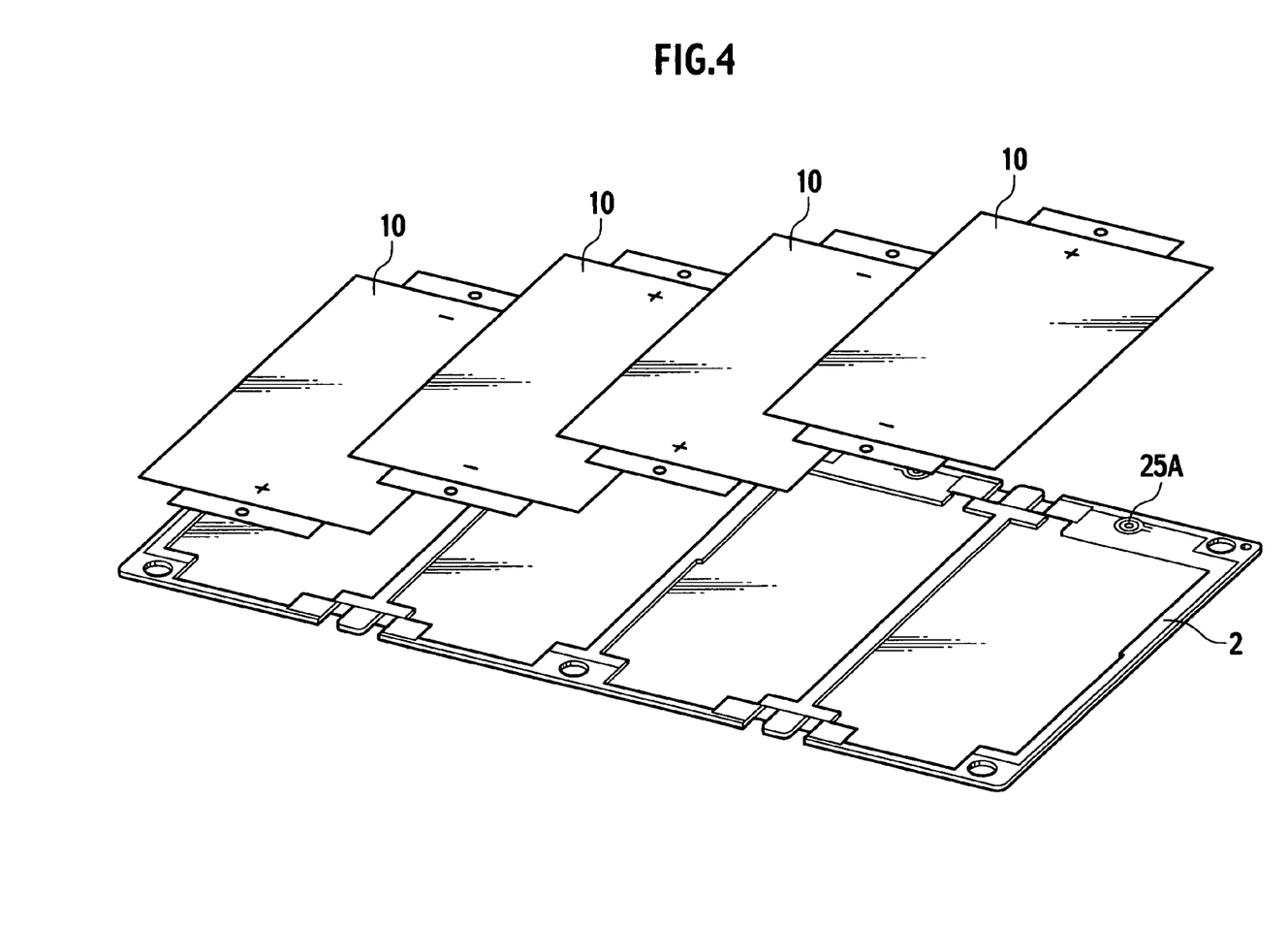
FIG. 4 is a perspective view showing how to locate single cells on a battery frame of the present invention.
Figure 5:
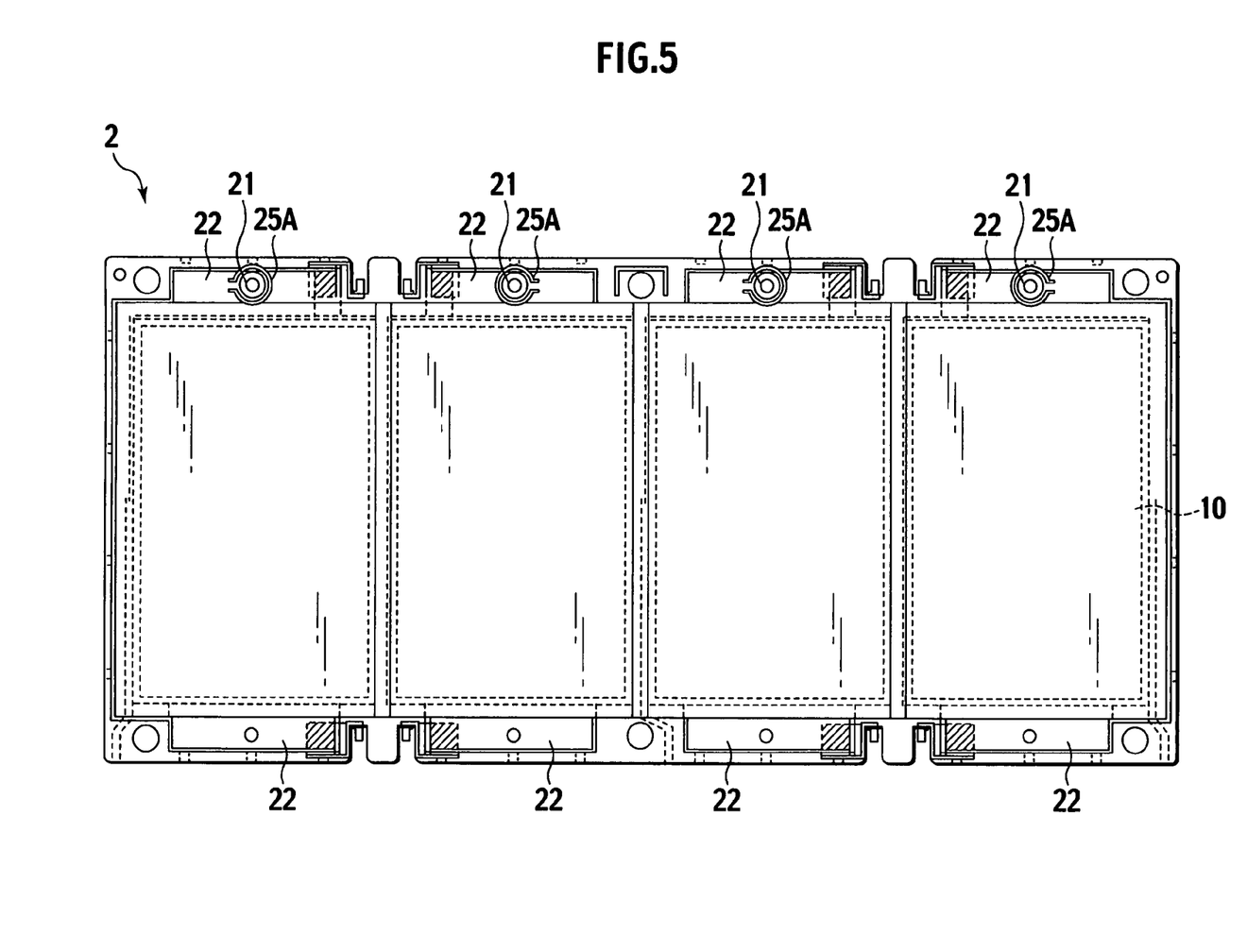
FIG. 5 is a plan view showing a state where the single cells are located on the frame.

As shown in FIGS. 4 and 5, four flat single cells 10 are arranged on each frame 2. The frames 2 in this state are stacked so that the battery 1 is constructed. In the battery 1, for example, 24 frames are stacked and an intermediate heat sink 5 is interposed between every six frames in the stacking direction. This means that, in each battery 1, 24 sets of four parallel-located single cells are stacked. Therefore, each battery 1 has 96 single cells in total.

Six pressure units for connecting both heat sinks 3 and 5 to each other are attached with nuts 6, thus fixing the heat sinks 3 and 5. Each pressure unit includes shafts fixed to both ends of a tension coil spring with the nuts 6. By attaching this unit between the heat sinks 3 and 5, appropriate surface pressure is applied in the stacking direction to all single cells which construct the cell unit 100.

Figure 2:
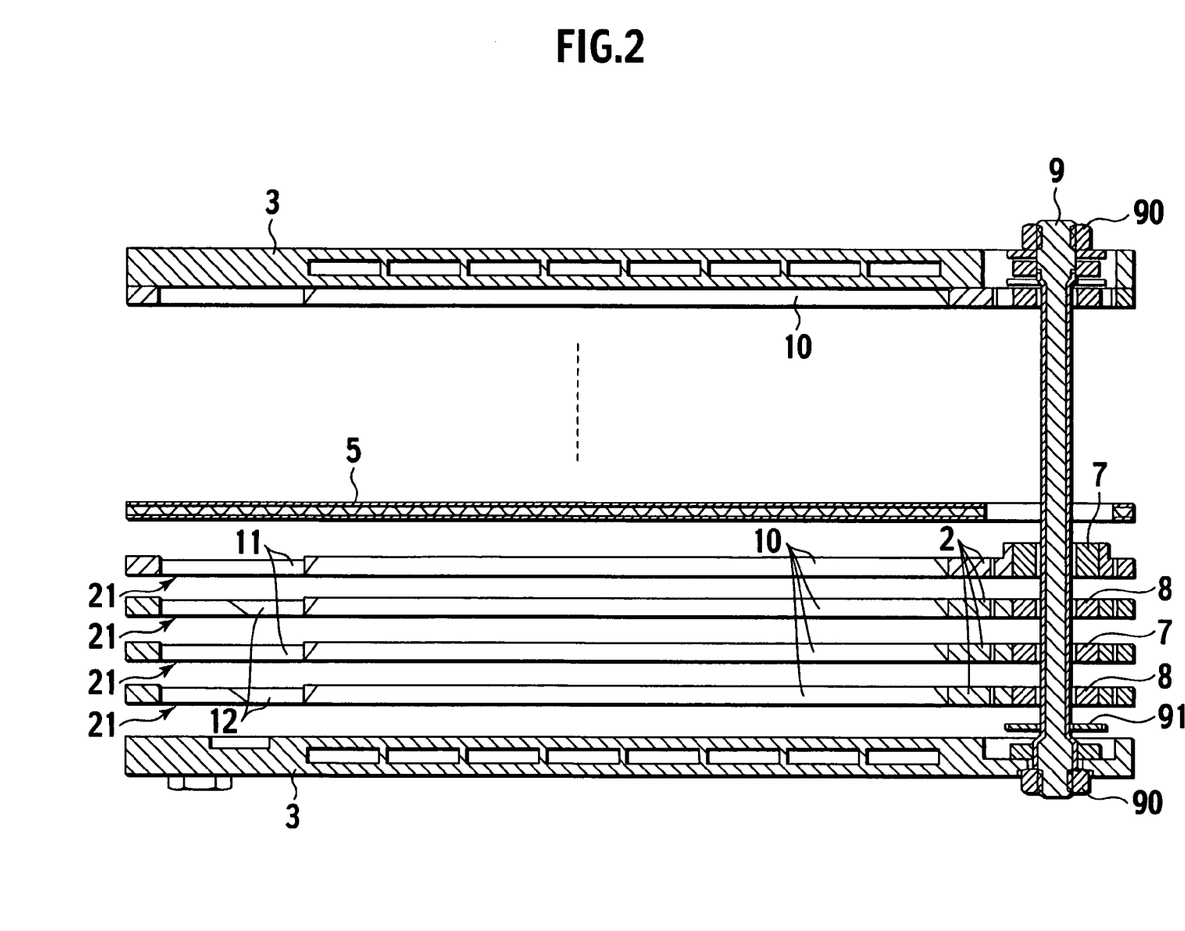
FIG. 2 is a cross-sectional view taken along the line II-II of the battery shown in FIG. 1.

The stack construction of the battery 1 is shown in FIG. 2. This drawing simplifies the construction for easy understanding of the present invention. In this drawing, there are only four frames 2 between the heat sinks 3 and 5, but in reality there are six frames provided between the heat sinks 3 and 4 in this embodiment.

Figure 3:
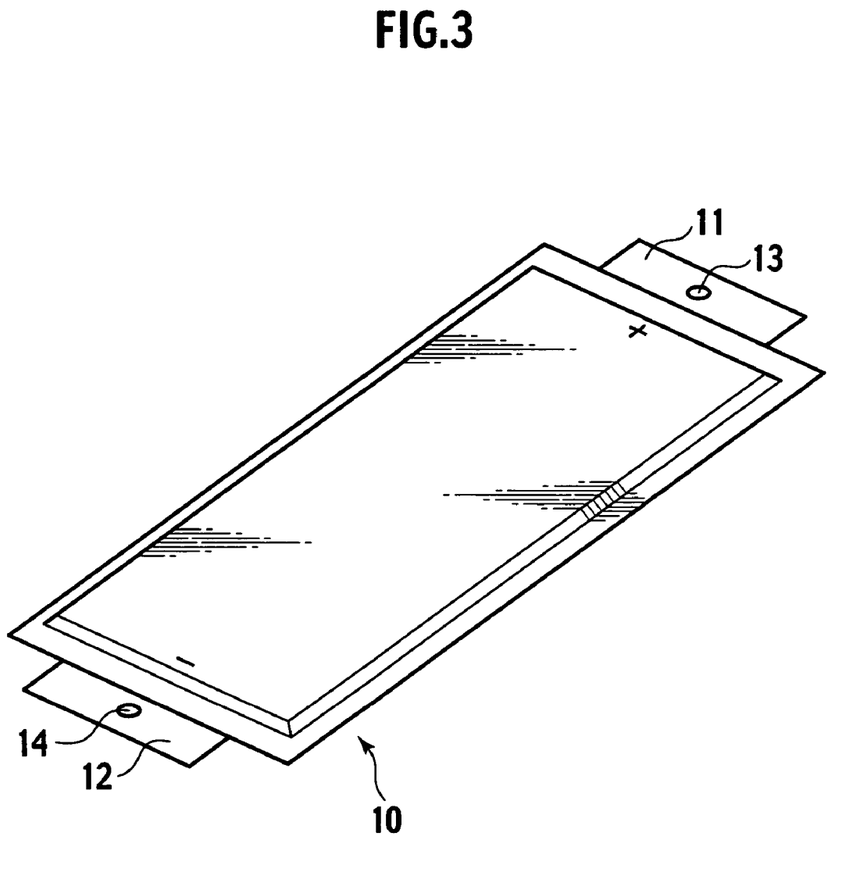
FIG. 3 is a perspective view showing a single cell to be incorporated in the battery of the present invention.

As shown in FIG. 2, a layer of single cells 10 is located on each frame 2, and these frames 2 are stacked within the battery 1. As shown in FIG. 3, the single cell 10 is flat, and a positive electrode tab 11 and a negative electrode tab 12 are drawn out from the flat body. The positive electrode tab 11 and the negative electrode tab 12 are connected to an electric-power generating element within the single cell 10, respectively. Through holes 13 and 14 are formed in the positive and negative electrode tabs 11 and 12, respectively.

As shown in FIG. 2, in the single cell 10, the positive electrode tab 11 and the negative electrode tab 12 are alternately located in the stacking direction. The positive and negative electrode tabs 11 and 12, which are alternately located, are connected to each other on the right and left sides in FIG. 2. This means that the single cells 10 are connected to each other in series in the stacking direction. A method of connecting the neighboring single cells 10 to each other in the stacking direction is as follows.

An opening portion 21 is provided in each frame 2 on the left side in FIG. 2. At this opening portion 21, the positive and negative electrode tabs 11 and 12 of the single cells 10 neighboring each other in the stacking direction are joined together by ultrasonic welding. At the opening portion 21, the single cell 10 is connected only to any one of the single cells 10 on the upper and lower layers. For example, the positive electrode tab 11 of the first layer and the negative electrode tab 12 of the second layer are joined together by ultrasonic welding at the opening portion 21, and the positive electrode tab 11 of the third layer and the negative electrode tab 12 of the fourth layer are joined together by ultrasonic bonding at the opening portion 21. Accordingly, on the left side in the drawing, the positive and negative electrode tabs 11 and 12 neighboring each other in the stacking direction are electrically connected to each other by ultrasonic welding.

Meanwhile, on the right side of FIG. 2, a conductive washer 7 (a conductive member) or an insulating washer 8 (an insulating member) is located in each frame 2. The thicknesses of these washers are the same or larger those of the frames 2. The frames 2 are stacked so that the conductive washer 7 and the insulating washer 8 are arranged alternately in the stacking direction. The positive and negative electrode tabs 11 and 12, which sandwich the conductive washer 7, are thus electrically connected to each other, and the positive and negative electrode tabs 11 and 12, which sandwich the insulating washer 8, are insulated from each other. For example, the conductive washer 7 is located between the positive electrode tab 11 of the second layer and the negative electrode tab 12 of the third layer, and the insulating washer 8 is located between the negative electrode tab 12 of the third layer and the positive electrode tab 11 of the fourth layer. Accordingly, on the right side of the drawing, the positive electrode tab 11 and the negative electrode tab 12 neighboring each other in the stacking direction are electrically connected to each other through the conductive washer 7.

Each of the conductive washers 7 and the insulating washers 8 is held by a holding member provided in the frame 2 so that the washers can swing in the stacking direction. The holding member will be described later.

A bolt 9 is inserted though the conductive washers 7 and the insulating washers 8 as well as the positive electrode tabs 11 and the negative electrode tabs 12. In each bolt 9, at least an area which comes into contact with the conductive washers 7 and the insulating washers 8, is covered with insulating members. Both ends of the bolt 9 are fastened by the nuts 90. Therefore, the conductive washers 7 and the insulating washers 8 are pressed from both sides in the stacking direction, ensuring that the conductive washer 7 or the insulating washer 8 and the positive electrode tab 11 or the negative electrode tab 12 are connected to each other.

Since the center portion of each frame 2 is open, the external surfaces of the single cells 10 neighboring in the stacking direction come into direct contact with each other within the battery 1.

A bus-bar 91 is inserted between the insulating washer 8 of the lowermost layer and the heat sink 3. The bus-bar 91 allows the neighboring cell units 100 to be electrically connected to each other. Therefore, all 96 single cells 10 are connected to each other in series within the battery 1.

Figure 6:
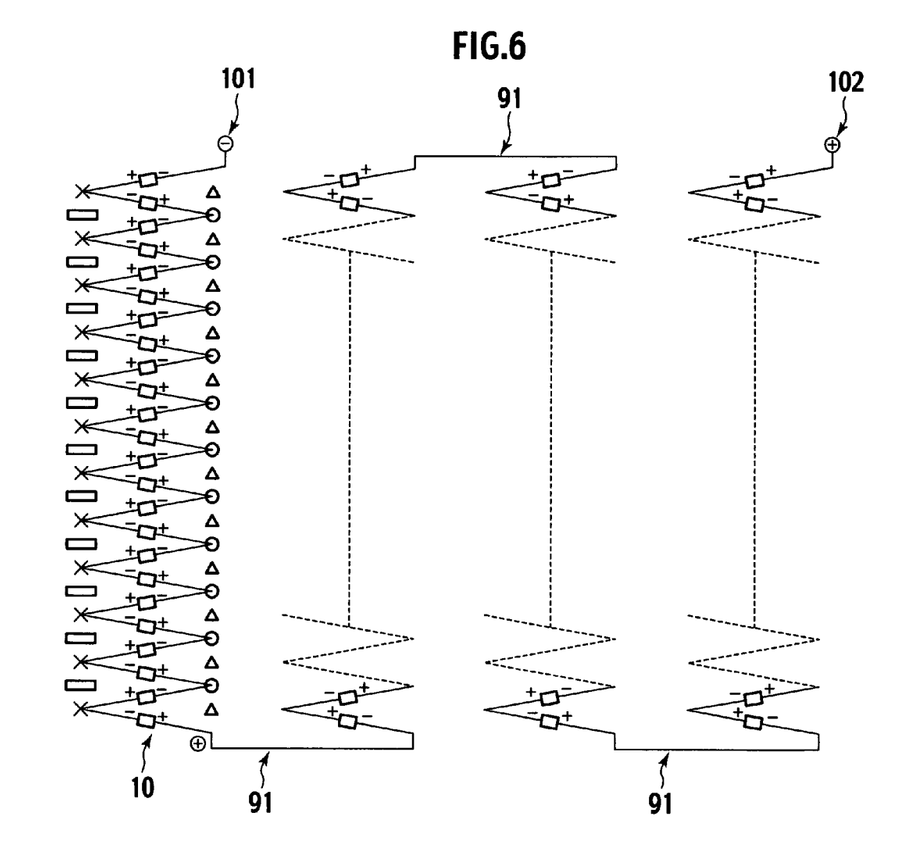
FIG. 6 is a view showing a circuit structure formed within the battery.

As shown in FIG. 6, in the battery 1, the single cells located on the frames 2 are serially connected to each other in the stacking direction, and the cell units 100 are connected to each other through the bus-bar 91, forming a single battery with high power. Reference numeral 101 in the drawing represents a negative electrode terminal of the battery and Reference numeral 102 represents a positive electrode terminal of the battery.

Each constituent of the battery is detailed below.

(Single Cell)

The single cell 10 used in this embodiment is a flat secondary cell having a rectangular shape as shown in FIG. 3 and provided with an electric-power generating element therein in which at least a positive electrode plates and a negative electrode plates are alternately stacked. For example, the single cell 10 has a construction disclosed in Japanese Patent Laid-Open Publication No. 2003-059486. Laminate films are used as sheath members for the single cell 10. Further, the electric-power generating element within the single cell 10 is sealed by joining the outer peripheries of the laminate films by thermal bonding.

The positive electrode tab 11 and the negative electrode tab 12 are drawn out from both sides of the single cell 10 in the longitudinal direction. The positive electrode tab 11 is constituted by, for example, an about 0.2 mm-thick aluminum sheet. The negative electrode tab 12 is constructed by, for example, an about 0.2 mm-thick copper sheet. The positive and negative electrode tabs 11 and 12 are provided with the through holes 13 and 14, respectively, through which the bolts 9 are inserted. The outer periphery of the single cell 10, which has been joined together by thermal bonding, is positioned on the frame and supported. The direction of stacking the single cells 10 is the same as the direction of stacking the positive and negative electrode plates which construct the electric-power generating element.

In the present invention, the battery 1 is configured by single cells, each having electrode tabs of different polarities on the two opposite sides of the cell as shown in FIG. 3. However, the battery 1 may be constructed by using single cells in which electrode tabs of different polarities are attached only on one side as disclosed in Japanese Patent Laid-Open Publication No. 2003-059486. Where this type of single cells are used, however, the structure of the frame and a method of connecting the single cells will be largely different from those of this embodiment. In this embodiment, a single flat cell is used as the single cell. However, a plurality of cells, which are connected to each other in series, parallel, or both in series and parallel, may be held on the frame as the single cell.

(Heat Sink)

As shown in FIGS. 1 and 2, the heat sinks used in this embodiment are of two types: the heat sinks 3 located on the uppermost and lowermost layers; and the intermediate heat sink 5, at least one of which is interposed between the stacked frames 2.

Both the heat sinks 3 and 5 play a role of heat dissipation boards which dissipate heat from the battery 1. The heat sinks 3 and 5 are made of, for example, copper, aluminum and magnesium, but the most suitable material is aluminum in terms of heat dissipation performance and light weight. The heat sink 5 has air vents penetrating therethrough in the longitudinal direction so as to improve heat dissipation efficiency.

Locating pins for positioning the stacked frames are provided at four corners of the heat sinks 3 on the lowermost layers. Therefore, of course, the frames 2 are provided with holes (not shown) through which the locating pins are inserted. When stacking the frames 2 onto the heat sink 3, these locating pins are inserted into the holes of the frames 2 for positioning of the frames.

In addition to the role of heat dissipation boards, the heat sinks 3 also play a role to apply appropriate surface pressure to the cell unit 100 and hold the cell unit 100 integrally with the heat sinks 3. The pressure units are attached between the heat sinks 3 in order to apply surface pressure to the cell unit 100. Each pressure unit has a tension coil spring and spring fixing portions, each being screwed with the end of the tension coil spring so that the ends of the spring are fixed to the heat sinks.

The tension coil spring is fixed to the heat sinks 3 so that the tension coil spring is extended between the heat sinks 3. Hence, surface pressure is applied to the cell unit 100 between the heat sinks 3.

(Frame)

The battery frame 2 used in this embodiment has electrode supporting portions 22 which support the positive electrode tabs 11 and the negative electrode tabs 12 of the single cells 10. The conductive washers 7 or insulating washers 8 are located on the electrode supporting portions 22 on one side of the frame, respectively. This is to connect the single cells 10 to each other in the stacking direction as stated earlier. The thickness dimension (dimension in the stacking direction) of the frame 2 is smaller than those of the conductive washers 7 or the insulating washers 8. This is because, if the thickness dimensions of the conductive washers 7 are not larger than that of the frame 2, the positive electrode tab 11 and negative electrode tab 12 cannot be electrically continuous.

FIG. 5 explains a case where the conductive washers 7 are held on the frame 2. However, the insulating washers 8 may, of course, be held in the frame 2.

The conductive washers 7 are held by holding members 25A formed in the electrode supporting portions 22.

(Holding Member)

Figure 7:
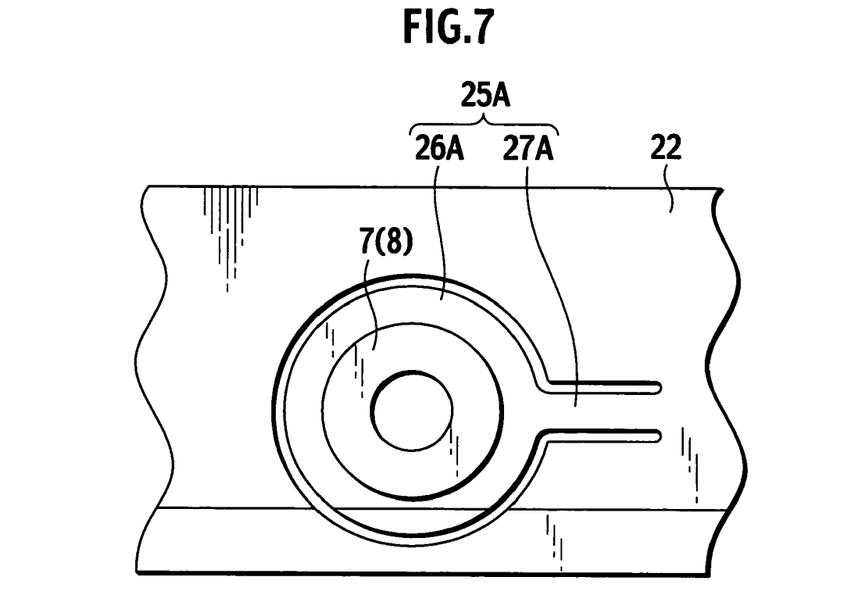
FIG. 7 is a plan view showing a holding member which holds a washer.
Figure 8:
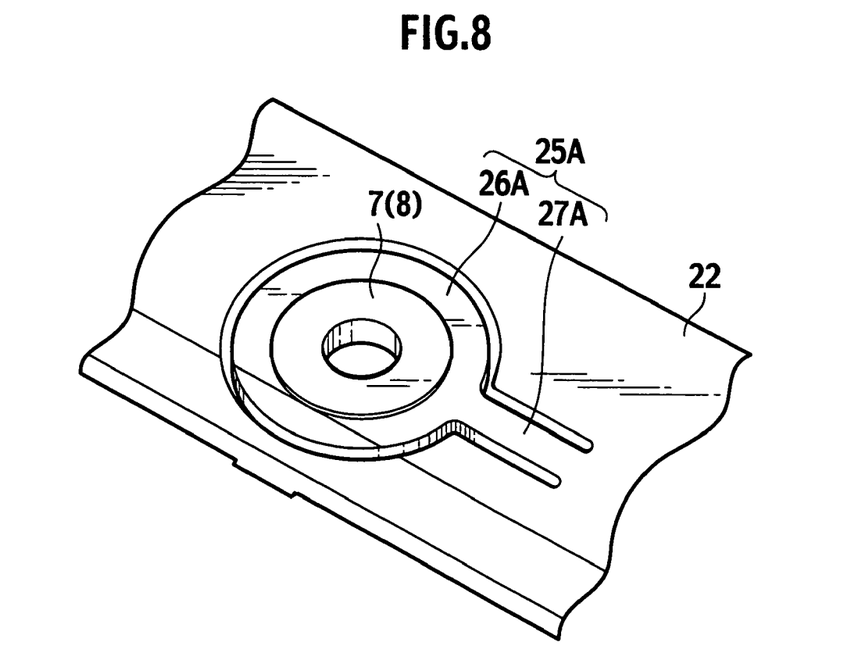
FIG. 8 is a perspective view showing the holding member which holds a washer.

As shown in FIGS. 5, 7 and 8, each holding member 25A is formed in each electrode supporting portion 22 and includes a circular portion 26A and a connecting portion 27A.

The circular portion 26A is formed by making a circular cut through the electrode supporting portion 22, and the conductive washer 7 or insulating washer 8 can be fitted to the center of the circle. The connecting portion 27A swingably connects an end of the circular portion 26A to the electrode supporting portion 22.

As shown in FIG. 7, in the first embodiment, the holding member 25A is formed integrally with the electrode supporting portion 22. In other words, the circular portion 26A and the connecting portion 27A are formed by making a keyhole-shaped cut through the electrode supporting portion 22 so that one end of the connecting portion 27A is not detached from the electrode supporting portion 22. Therefore, no member other than the electrode supporting portion 22 is used to form the holding member 25A.

The connecting portion 27A holds only a part of the circular portion 26A. Therefore, as the connecting portion 27A swings due to elasticity, the circular portion 26A can also swing vertically. This means that, while holding the conductive washer 7 or the insulating washer 8, the holding member 25A can allow the conductive washer 7 or the insulating washer 8 to swing in the stacking direction.

As described above, in the present invention, the conductive washer 7 and the insulating washer 8 is not firmly fixed to the battery flame but held to be able to swing in the stacking direction. Accordingly, the following effects can be obtained.

Even where the heights of the conductive washers 7 and the insulating washers 8 are different from those of the single cells 10, in other words, even where the heights of the single cells 10 are larger than those of the conductive washers 7 and the insulating washers 8, the frame 2 is not deformed during the formation of the battery 1. When the bolt 9 is inserted through the conductive washers 7 or the insulating washers 8 as well as the positive electrode tabs 11 or the negative electrode tabs 12 and fastened with the nuts 90 at both ends thereof, height differences between the single cells 10 and the conductive and insulating washers 7 and 8 are absorbed by the swing of the conductive washers 7 and the insulating washers 8. Therefore, no load is applied to the frames 2. Since no load is applied to the frames 2, it is possible to prevent a situation where a specific fastening force cannot be obtained due to a reaction force of the frame 2 even if the bolt 9 is fastened with nuts 6.

Moreover, even if the position of the frame 2 is somewhat tilted, the conductive washers 7 can move to appropriate positions by the swing. This ensures that the conductive washer 7 and the positive electrode tab 11 or the negative electrode tab 12 are electrically continuous. It is also possible to prevent a failure or difficulty to allow the conductive washer 7 and the positive electrode tab 11 or the negative electrode tab 12 to come into contact with each other due to deformation of the frame 2.

In addition, when the conductive washers 7 and the insulating washers 8 are attached to the frame 2, careful adjustment of positioning accuracy of these washes are unnecessary since it is automatically adjusted by the swing of the conductive washers 8 and the insulating washers 7 to some extent.

Moreover, in the first embodiment, the holding member 25A for holding the conductive washer 7 or the insulating washer 8 is formed by making a cut through the electrode supporting portion 22. Therefore, the holding member 25A is easily formed, which realizes good working efficiency in forming the holding member 25A. Thus, manufacturing costs are reduced.

Furthermore, in the foregoing embodiment, description was given regarding the case where the conductive washers 7 are used as conductive members and the insulating washers 8 are used as insulating members. However, the conductive members and the insulating members are not limited to those having a washer shape.

In the first embodiment, the holding member 25A is formed integrally with the electrode supporting portion 22. However, the formation thereof is not limited to this.

The holding member can also be formed separately from the electrode supporting portion 22. An example of such formation is shown in FIGS. 9 and 10.

Figure 9:
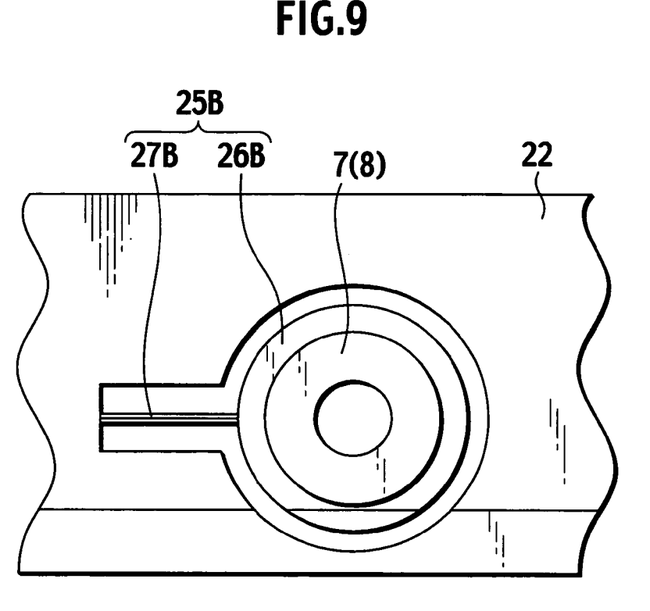
FIG. 9 is a plan view showing another example of the holding member.
Figure 10:
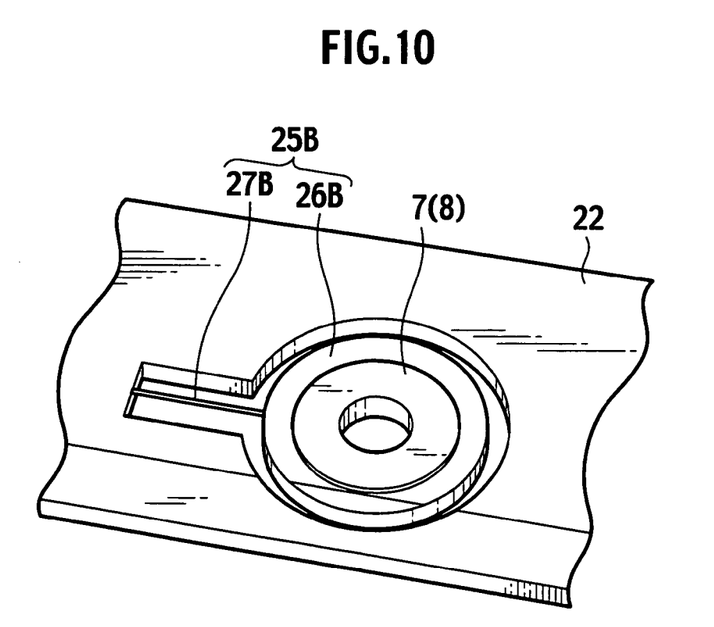
FIG. 10 is a perspective view showing the another example of the holding member.

As shown in FIGS. 9 and 10, a keyhole-shaped hole is bored through the electrode supporting portion 22 and then a holding member 25B is provided in the hole.

The holding member 25B includes a circular portion 26B, into which the conductive washer 7 or the insulating washer 8 is fitted, and a connecting portion 27B connecting the circular portion 26B to the electrode supporting portion 22. Unlike the foregoing connecting portion 27A, the connecting portion 27B is separated from the electrode supporting portion 22. However, similarly to the connecting portion 27A, the connecting portion 27B swingably holds the circular portion 26B by its elasticity.

Therefore, the holding member 25B can provide effects similar to those stated earlier. However, formation of the holding member 25B is not so easy as the foregoing holding member 25A since the connecting portion 27B is separated from the electrode supporting portion 22.

Second Embodiment

In the first embodiment, the circular portions 26A and 26B, to which the conductive washers 7 and the insulating washers 8 are fitted, are able to swing, so that the conductive washers 7 and the insulating washers 8 are also able to swing relative to the frame 2. In the second embodiment, conductive washers 7 and insulating washers 8 are allowed to swing without being fitted into the circular portion 26A and 26B.

Described below are only a holding member, a conductive washer 7 and an insulating washer 8. Other parts are the same as those of the first embodiment.

Figure 11:
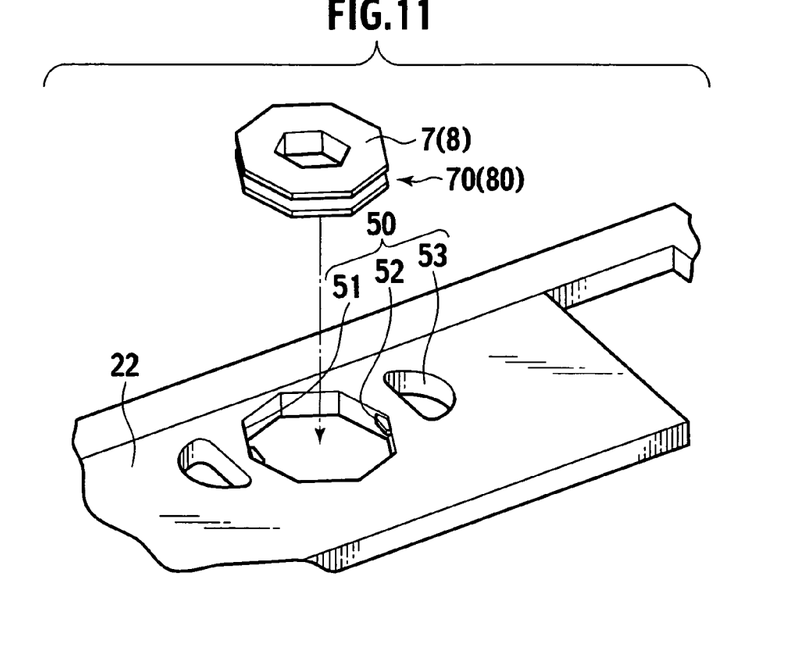
FIG. 11 is a perspective view showing a fitting-in type holding member.
Figure 12:
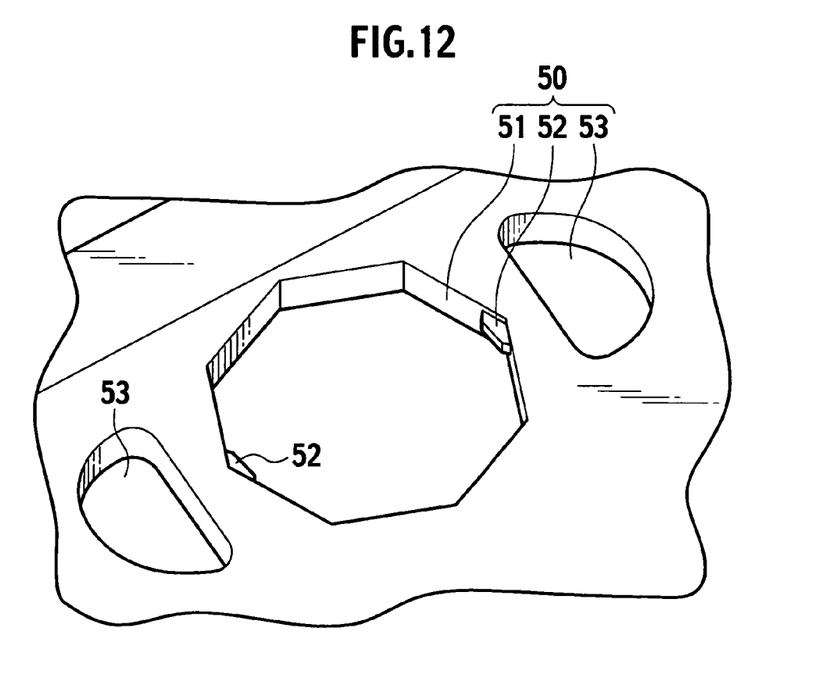
FIG. 12 is an enlarged view showing the fitting-in type holding member.
Figure 14:
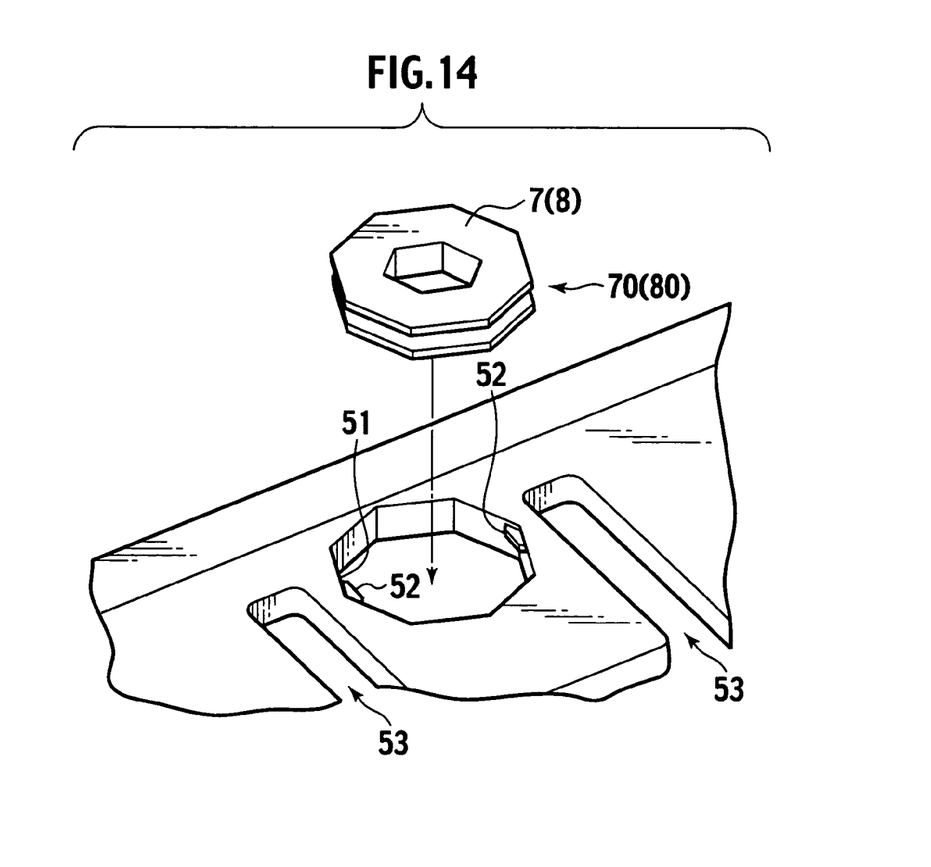
FIG. 14 is a perspective view showing another example of the fitting-in type holding member.

As shown in FIGS. 11, 12 and 14, a holding member 50 according to the second embodiment includes a positioning portion 51, protruding portions 52, and relief portions 53. The positioning portion 51 is provided by perforating a part of the electrode supporting portion 22 and fitted to the outer edge of a conductive washer 7 or an insulating washer 8. The protruding portions 52 protrude from the positioning portion 51 towards the conductive washer 7 or the insulating washer 8 when the conductive washer 7 or the insulating washer 8 is located in the positioning portion 51. The relief portions 53 are formed on the periphery of the positioning portion 51 by opening holes through the electrode supporting portion 22. The relief portions 53 allow the positioning portion 51 to deform so that the conductive washer 7 or the insulating washer 8 can be fit into the positioning portion 51.

Figure 13:
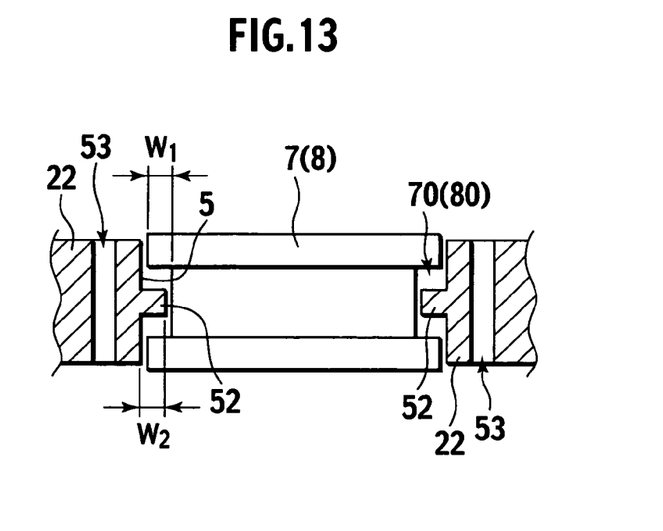
FIG. 13 is a cross-sectional view showing a state where a washer is fitted into the holding member.

As shown in FIG. 13, in the second embodiment, grooves 70 and 80 are formed in the circumferences of the conductive washer 7 and the insulating washer 8, respectively. The widths W1 of the groove 70 and 80 are larger than the widths W2 of the protruding portions 52 of the holding member 50.

When attempting to fit the conductive washer 7 into the positioning portion 51 as shown by an arrow in FIG. 11, the conductive washer 7 is not easily fit thereinto because the protruding portions 52 catch the conductive washer 7. However, once a force is applied, the protruding portions 52 are deformed as if they escape towards the relief portions 53. The conductive washer 7 is thus fit into the positioning portion 51. The insulating washer 8 is fit into the positioning portion 51 in the same manner.

FIG. 13 shows a state where the conductive washer 7 has been fit to the positioning portion 51. As shown in FIG. 13, the protruding portions 52 of the holding member 50 protrude into the groove 70 of the conductive washer 7. Once a force is applied to allow the protrude portions 52 to enter the groove 70, the conductive washer 7 is not removed from the holding member 50 unless a force is applied again to deform the protruding portions 52.

Since the width W1 of the groove 70 is larger than the widths W2 of the protruding portions 52, the conductive washer 7 can swing in the stacking direction without allowing the protruding portions 52 to be disengaged from the groove 70.

As described so far, in the second embodiment, the holding members 50 hold the conductive washers 7 and the insulating washers 8 so that these washers can swing in the stacking direction. Therefore, the holding members 50 can provide effects similar to those of the first embodiment. To be more specific, even though the heights of the conductive washers 7 and the insulating washers 8 are different from the heights of the single cells 10, the frames 2 are not deformed during the formation of the battery 1. Since no load is applied to the frames 2, it is possible to prevent a situation where a specific fastening force cannot be obtained due to a reaction force of the frame 2 even if the bolt 9 is fastened with nuts 6.

Further, even if the position of the frame 2 is somewhat tilted, the conductive washers 7 can move to appropriate positions by the swing, which ensures that the conductive washer 7 and the positive electrode tab 11 or the negative electrode tab 12 are electrically continuous. It is also possible to prevent a failure or difficulty to allow the conductive washer 7 and the positive electrode tab 11 or the negative electrode tab 12 to come into contact with each other due to deformation of the frame 2.

In the second embodiment, the relief portions 53 are formed by making holes in the electrode supporting portion 22. However, the formation of the relief portions 53 is not limited thereto. As shown in FIG. 14, the relief portions 53 may be formed by making cuts in the electrode supporting portion 22 on the periphery of the positioning portion 51.

Figure 15:
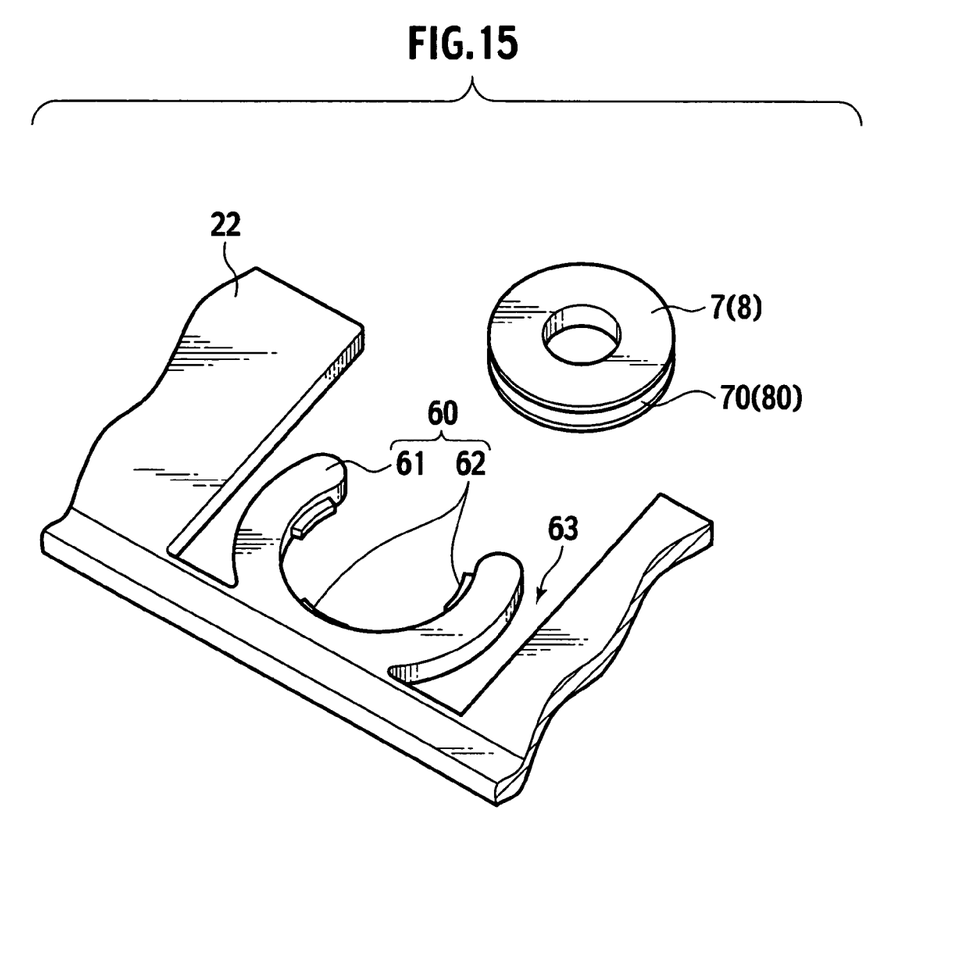
FIG. 15 is a perspective view showing a clip-type holding member.
Figure 16:
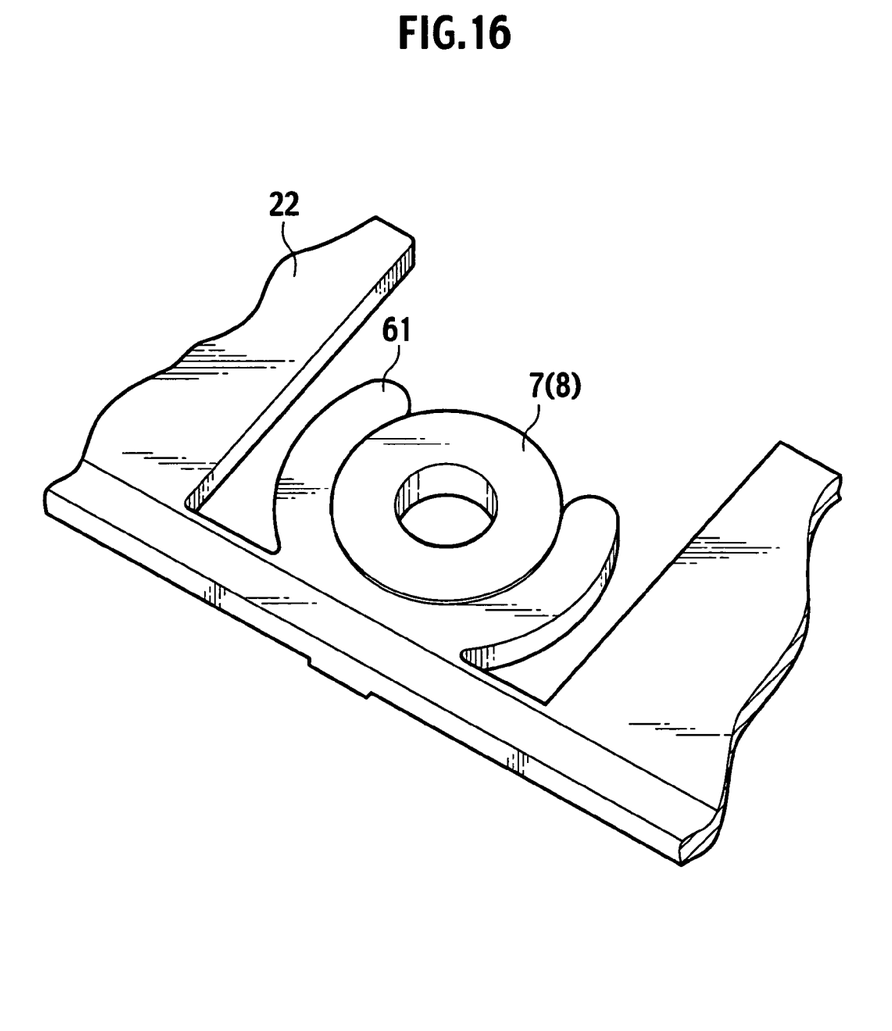
FIG. 16 is a perspective view showing a state where a washer is held by the clip-type holding member.

Moreover, in the second embodiment, the positioning portion 51 is provided by perforating a part of the electrode supporting portion 22. However the formation of the positioning portion 51 is not limited thereto. As shown in FIGS. 15 and 16, the positioning portion can be of clip type.

As shown in FIG. 15, in a holding member 60 of the clip type, a U-shape positioning portion 61 is formed in stead of perforating the electrode supporting portion 22. The U-shape positioning portion 61 has an inner circumference longer than a half of the outer circumference of the conductive washer 7 or the insulating washer 8.

Protruding portions 62 are protruding from the positioning portion 61. Similarly to the foregoing protruding portions 52, the protruding portions 62 protrude into the groove 70 or 80 when the conductive washer 7 or the insulating washer 8 is fit into the positioning portion 61. The widths of the protruding portions 62 are smaller than those of the grooves 70 and 80.

Clearances 63 are provided between the periphery of the positioning portion 61 and the electrode supporting portion 22. With these clearances 63, the clip-like positioning portion 61 opens when, for example, the conductive washer 7 is pushed towards the positioning portion 61. Thus, the conductive washer 7 is fit into the positioning portion 61 and held.

The state where the conductive washer 7 has been fit into the positioning portion 61 is similar to the state shown in FIG. 14. Therefore, the conductive washer 7 can swing in the stacking direction without allowing the protruding portions 62 to be disengaged from the groove 70. The insulating washer 8 can also be held by the holding member 60 in the similar manner.

As described so far, by forming the holding member into the clip type, the conductive washer 7 and the insulating washer 8 can be held by the holding member 60 more easily. Therefore, work efficiency is improved.

The entire content of a Japanese Patent Application No. P2004-099328 with a filing date of Mar. 30, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A plurality of battery frames stacked in a thickness direction of flat cells, each of the battery frames mounting and positioning at least one of the flat cells, the flat cells including:
    an electric-power generating element in which positive electrode plates and negative electrode plates are stacked;
    a sheath member which seals therein the electric-power generating element; and
    a positive electrode tab and a negative electrode tab which are electrically connected to the electric-power generating element and are drawn outward from the sheath member, wherein the battery frames and the flat cells form a battery,
    wherein each of the battery frames comprises:
        any one of a conductive member and an insulating member which are sandwiched between the electrode tabs of the flat cells stacked in the thickness direction and which are alternately arranged in the thickness direction when the battery is formed, the conductive member electrically connecting the flat cells to each other and the insulating member electrically insulating the flat cells from each other;
        a holding member which holds any one of the conductive member and the insulating member so that the conductive member or the insulating member can swing in the thickness direction; and
        an electrode supporting portion in which the holding member is provided and which supports each of the electrode tabs of the flat cells and is provided between the electrode tabs of the flat cells stacked.

2. A plurality of battery frames according to claim 1, wherein a thickness of a frame in the thickness direction is smaller than those of the conductive member and the insulating member.

3. A plurality of battery frames according to claim 1, wherein the holding member comprises:
    a circular portion which is formed by making a circular cut through the electrode supporting portion and to which the conductive member or the insulating member is fitted; and
    a connecting portion which swingably connects one end of the circular portion to the electrode supporting portion.

4. A plurality of battery frames according to claim 3, wherein the circular portion and the connecting portion are formed integrally with the electrode supporting portion.

5. A plurality of battery frames according to claim 1, wherein the holding member comprises:
    a positioning portion which is fitted to an outer edge of the conductive member or the insulating member and positions the conductive member or the insulating member in a direction almost perpendicular to the thickness direction; and a protruding portion which protrudes from the positioning portion towards the conductive member or the insulating member, wherein a groove, which has a width larger than that of the protruding portion, is formed on a circumference surface of the conductive member or the insulating member, and wherein the conductive member or the insulating member is fitted into the positioning portion so that the protruding portion goes into the groove.

6. A plurality of battery frames according to claim 5, wherein a relief portion is provided on a periphery of the positioning portion so that the positioning portion can be deformed in a direction perpendicular to the thickness direction.

7. A battery, comprising:

a plurality of flat cells, the flat cells comprising:
   an electric-power generating element in which positive electrode plates and negative electrode plates are stacked;
   a sheath member which seals therein the electric-power generating element; and
   a positive electrode tab and a negative electrode tab which are electrically connected to the electric-power generating element and are drawn outward from the sheath member;

a conductive member and an insulating member which are sandwiched between the electrode tabs of the flat cells, the flat cells being stacked in a thickness direction of the flat cells and which are alternately arranged in the thickness direction when the battery is formed, the conductive member electrically connecting the flat cells to each other and the insulating member electrically insulating the flat cells from each other; and a plurality of frames stacked in the thickness direction, each of the frames mounting and positioning at least one of the flat cells and comprising:
   a holding member which holds any one of the conductive member and the insulating member so that the conductive member or the insulating member can swing in the thickness direction; and
   an electrode supporting portion in which the holding member is provided and which supports each of the electrode tabs of the flat cells and is provided between the electrode tabs of the flat cells stacked.

8. A battery according to claim 7, wherein a thickness of a frame in the thickness direction is smaller than those of the conductive member and the insulating member.

9. A battery according to claim 7, wherein a holding member comprises:

a circular portion which is formed by making a circular cut through the electrode supporting portion and to which the conductive member or the insulating member is fitted; and a connecting portion which swingably connects one end of the circular portion to the electrode supporting portion.

10. A battery according to claim 9, wherein the circular portion and the connecting portion are formed integrally with the electrode supporting portion.

11. A battery according to claim 7, wherein the holding member comprises:

a positioning portion which is fitted to an outer edge of the conductive member or the insulating member and positions the conductive member or the insulating member in a direction almost perpendicular to the thickness direction; and a protruding portion which protrudes from the positioning portion towards the conductive member or the insulating member, wherein a groove, which has a width larger than that of the protruding portion, is formed on a circumference surface of the conductive member or the insulating member, and wherein the conductive member or the insulating member is fitted into the positioning portion so that the protruding portion goes into the groove.

12. A battery according to claim 11, wherein a relief portion is provided on a periphery of the positioning portion so that the positioning portion can be deformed in a direction perpendicular to the thickness direction.

13. A plurality of battery frames stacked in a thickness direction of flat cells, each of the battery frames mounting and positioning at least one of the flat cells, the flat cells including:

an electric-power generating element in which positive electrode plates and negative electrode plates are stacked;

a sheath member which seals therein the electric-power generating element; and a positive electrode tab and a negative electrode tab which are electrically connected to the electric-power generating element and are drawn outward from the sheath member, wherein the battery frames and the flat cells form a battery, wherein each of the battery frames comprises:
   any one of a conductive member and an insulating member which are sandwiched between the electrode tabs of the flat cells stacked in the thickness direction and which are alternately arranged in the thickness direction when the battery is formed, the conductive member electrically connecting the flat cells to each other and the insulating member electrically insulating the flat cells from each other;
   holding means for holding any one of the conductive member and the insulating member so that the conductive member or the insulating member can swing in the thickness direction; and
an electrode supporting portion in which the holding means is provided and which supports each of the electrode tabs of the flat cells and is provided between the electrode tabs of the flat cells stacked.

* * * * *